United States Patent [19]

Nickell

[11] 3,909,238

[45] Sept. 30, 1975

[54] RIPENING OF SUGARCANE BY USE OF POLYETHYLENE OXIDE ADDUCTS OF FATTY ACID ESTERS OF SORBITOL

[75] Inventor: Louis G. Nickell, Honolulu, Hawaii

[73] Assignee: Hawaiian Sugar Planters' Association, Honolulu, Hawaii

[22] Filed: Apr. 15, 1974

[21] Appl. No.: 461,107

Related U.S. Application Data

[63] Continuation-in-part of Ser. No. 275,890, July 27, 1972, abandoned.

[52] U.S. Cl. .................................................. 71/106
[51] Int. Cl.² ........................................... A01N 9/24
[58] Field of Search ..................................... 71/106

[56] References Cited
UNITED STATES PATENTS

3,224,865  12/1965  Carlson ................................. 71/115
3,660,072  5/1972  Nickell .................................. 71/76

OTHER PUBLICATIONS

Romaioh et al., Proceedings, 29th Annual Convention of The Sugar Tech. Assoc. of India, 1961, Part II.

Primary Examiner—James O. Thomas, Jr.
Attorney, Agent, or Firm—Burns, Doane, Swecker & Mathis

[57] ABSTRACT

Sucrose yield of sugarcane is increased by treating sugarcane a few weeks prior to harvest with an effective amount of polyethylene oxide adducts of fatty acid esters of sorbitol or sorbitol anhydride. An exemplary sugarcane ripening agent is polyoxyethylene sorbitan monolaurate.

9 Claims, No Drawings

RIPENING OF SUGARCANE BY USE OF POLYETHYLENE OXIDE ADDUCTS OF FATTY ACID ESTERS OF SORBITOL

REFERENCE TO RELATED APPLICATIONS

This application is a continuation-in-part of copending application Ser. No. 275,890, filed July 27, 1972 and now abandoned.

BACKGROUND OF THE INVENTION

Considerable progress has been made in the last several years in increasing the sugar yeild of sugarcane by improving the varieties being planted, enriching the soil with fertilizers and irrigating the soil in climates which do not naturally provide sufficient moisture for optimum plant growth. More recent efforts in improving sugar production have increasingly turned toward the use of chemicals in modifying and controlling the physiological processes of sugarcane, particularly in ripening prior to harvest. See U.S. Pat. Nos. 3,224,865; 3,245,775; 3,291,592; 3,482,958; 3,482,959; 3,492,961; and 3,493,361.

With some compounds previously suggested for this purpose there has been some concern about their resistance to breakdown in the plant and their persistence in the soil when the intended use of the sugar is nutritive as opposed to industrial (e.g., in fermentation processes). Consequently, extensive efforts continue to be made in searching for physiologically harmless or rapidly degradable chemical agents that can be effectively used to modify the ripening of sugarcane so as to increase the sucrose yield therefrom.

Generally speaking, chemicals selected for evaluation have been of types which have been previously found active in work with other plants as plant hormones, herbicides or inhibitors of growth of terminal buds, or active in killing the spindle of cane upon topical micro-application, etc. However, among the compounds heretofore found to be useful for such other special purposes, very few have been found effective in controlling the ripening of sugarcane in the desirable manner. No relationship has been recognized to date between the chemical structure of such compounds and (a) their phytotoxic effects, (b) their physiological effects on the morphogenetic development of the plant, and (c) their activity in having positive effects on ripening. In other words, the effectiveness of a compound in controlling the ripening of sugarcane and thereby increasing sugar yield remains essentially unpredictable, and the search for suitable agents continues to be fundamentally empirical.

A review of the literature discloses that some work has been done using surfactants to increase the crystallization rate of cane sugar and in the purification of sugar juices. See Ramaiah et al, Proceedings, 29th Annual Convention of the Sugar Tech. Assoc. of India, 1961, Part II. Some of the surfactant compounds of the present invention have also been used in very minor, i.e., surfactant, amounts simply as wetting agents in applying an active ingredient such as a benzoic acid compound to cane stalks for sugarcane ripening. See, for example, U.S. Pat. No. 3,224,865. However, surfactants produced by the $C_{12}$ to $C_{18}$ fatty acid esterification of sorbitol or its anhydrides (hereinafter called fatty acid esters of sorbitol) have not been recognized as useful per se as sugarcane ripening agents. Surfactants prepared from fatty acid esters of sorbitol are available commerically, and are regarded as materials of only slight to moderate oral and skin penetration toxicity. Such compounds have been exempted by the Food and Drug Administration from tolerance requirements when used in or on raw agricultural commodities as surfactants.

It is an object of this invention to provide a new agent for controlling the ripening of sugarcane. A more specific object is to increase the sucrose yield of sugarcane by chemically treating it during its final ripening stages prior to harvest without introducing substantial toxicological hazards, and preferably without causing visible (phytotoxic) damage to the cane plant, such as drying of the spindle or other leaf.

Still more specifically, it is an object of this invention to increase the sucrose yield of sugarcane by treating it prior to harvest with a chemical agent which is sufficiently stable to provide the desired effect over a period of several weeks and thus give adequate operational flexibility, but which has a relatively low degree of persistence in the soil and is susceptible to decomposition by soil bacteria. Compounds which increase the sucrose content of sugarcane only temporarily over a period of 2 or 3 weeks after application and then result in a substantial decrease are generally not desirable for the intended purpose.

SUMMARY OF THE INVENTION

It has now been discovered that excellent results in increasing the sucrose yield of sugarcane can be obtained by applying to the sugarcane at a time at least two weeks and up to about 10 weeks before harvest an effective amount of a composition containing as essentially the sole active ingredient a fatty acid ester of sorbitol.

A great number of compounds are known to be useful as surfactants for various types of active ingredients including herbicides, pesticides, plant growth regulants, plant hormones and sugarcane ripening agents. Many of these known surfactant compounds have been tested for sugarcane ripening abilities without success. Although the above-defined compounds are among those compounds generally known as surfactants and at least some of them have been used or suggested for use as a surfactant in an aqueous composition containing a recognized sugarcane ripening agent, it has surprisingly been found that the particular compounds defined above are themselves as sugarcane ripening agents when applied to field growing sugarcane as the sole active component and in an amount sufficient to increase the sucrose yield.

DESCRIPTION OF SPECIFIC EMBODIMENTS

The effective polyethylene oxide adducts of fatty acid esters of sorbitol include esters and mixtures of esters of $C_{12}$ to $C_{18}$ fatty acids of sorbitol and its anhydrides containing from about 10 to about 30, preferably about 20, moles of ethylene oxide per mole of sorbitol. Sorbitol anhydride is commonly known as sorbitan. Exemplary compounds include polyoxyethylene sorbitan monolaurate, polyoxyethylene sorbitan monopalmitate, polyoxyethylene sorbitan monostearate, polyoxyethylene sorbitan monooleate and polyoxyethylene sorbitan trioleate. The preferred sugarcane ripening agent is polyoxyethylene sorbitan monolaurate.

These compounds are generally liquid under normal ambient conditions and are used in essentially 100 percent concentration. The solid polyoxyethylene stearates may also be employed. However, these compounds are insoluble in water and have to be dispersed in water in a non-aqueous solvent. The liquid compounds are thus preferred.

In accordance with this invention, the sugarcane crop is treated with a compound at any time from 2 to 10 weeks before harvest, the preferred time for treatment being between about 3 and 8 weeks prior to harvest.

The sugarcane crop is treated with the above-defined active compounds in an amount sufficient to increase the sucrose yield obtained from the sugarcane. Excellent results are obtained when the sugarcane crop is treated at a rate in the range of from about 4 pounds up to about 40 or 60 pounds per acre or more of the active compound per acre of sugarcane, though higher rates may be used. The optimum amount will vary somewhat depending on the specific treating composition applied, environmental conditions, time of year, age of cane and in some cases the specific variety of cane being treated, but can be readily determined for each particular case by preliminary testing. It has been found that amounts of less than about 1 pound the compound per acre are ineffective for increasing the sucrose yield of the growing sugarcane.

The active agent is conveniently applied in the field in the form of an aqueous solution or suspension, e.g., a liquid composition which may be sprayed from a boom-spray or a solid dust composition where the active compound is diluted with an inert solid such as clay and which can be applied as a dust from an airplane.

With the type of boom-spray apparatus used in this work, it has been found convenient to apply the active compound to the sugarcane field in the form of an aqueous solution, suspension or emulsion having a concentration of active agent such that the application at the rate of from 7 to 20 gallons of liquid composition per acre will provide the required dosage of active chemical. However, the use of lower or higher gallonages may be preferred when a different dispensing mechanism is used.

Water is the preferred liquid carrier for the active ripeners in practicing the present invention. Other active ingredients are not required and are preferably omitted.

The invention is additionally illustrated in connection with the following Examples which are to be considered as illustrative of the present invention. It should be understood, however, that the invention is not limited to the specific details of the Examples.

EXAMPLE I

A polyethylene oxide adduct of each of the monolaurate, monopalmitate, monostearate, monooleate and trioleate esters of sorbitan were deposited or dropped by means of a syringe with a fine needle on the spindle area at the top of the last visible dewlap of each of 20 stalks of sugarcane aged 20 months. (A dewlap is the junction between the blade of the leaf and the leaf sheath which clasps the stalk.) The stalks were contacted with about either 0.3 ml or 38 mg deposits of each sugarcane ripening agent which corresponds to an application rate of about 33 pounds or 4 pounds, respectively, of the agent per acre of sugarcane. Ten of these stalks were harvested 4 weeks after such treatment and 10 more were harvested 5 weeks after such treatment.

"Trysben" (dimethylamine salt of trichlorobenzoic acid), a known sugarcane ripening agent, was also used to treat an equal number of stalks for comparison purposes because of its consistent activity. The "Trysben" commercial product (a 50 weight percent aqueous solution of the salt available from the E. I. duPont de Nemours and Co.) was diluted with an equal weight of water and the resulting solution (which also contains about 0.25 weight percent nonylphenyl ethoxylated to contain about 10.5 moles of ethylene oxide per mole of nonylphenyl) was applied to the stalks in the manner described above in an amount of 0.3 ml/stalk which is equivalent to 4 lbs/acre of Trysben.

The top 15 joints of the treated cane as well as those of similar untreated cane were removed, combined and analyzed in terms of juice purity and pol percent cane, following the so-called "press method" developed by T. Tanimoto, Hawaiian Planters Record, 57, 133 (1964). "Pol percent cane" is a polarimetric determination and equals the percentage of sucrose if the latter is the only substance in the solution which will rotate the plane of polarized light. In any event, determination of the pol percent cane is a standard and effective method for determining the sucrose content of sugarcane.

The results are given below:

|  | Time From Treatment to Harvest | | | |
|---|---|---|---|---|
|  | Four Weeks | | Five Weeks | |
|  | Juice Purity | Pol % Cane | Juice Purity | Pol % Cane |
| Control (untreated) | 78.14 | 9.80 | 78.20 | 10.36 |
| Polyoxyethylene sorbitan monolaurate (33 lbs/acre) | 84.67 | 12.56 | 86.87 | 12.90 |
| Polyoxyethylene sorbitan monopalmitate (4 lbs/acre) | 79.05 | 10.51 | 80.30 | 10.98 |
| Polyoxyethylene sorbitan monostearate (4 lbs/acre) | 83.91 | 11.79 | 83.96 | 11.60 |
| Polyoxyethylene sorbitan monooleate (4 lbs/acre) | 79.13 | 9.95 | 82.19 | 11.14 |
| Polyoxyethylene sorbitan trioleate (4 lbs/acre) | 79.95 | 10.41 | 82.31 | 11.59 |
| Trysben (4 lbs/acre) | 82.08 | 10.86 | 79.64 | 10.21 |

As is apparent, the application of the polyethylene oxide adducts of the fatty acid esters of sorbitol resulted in a very substantial improvement in both juice purity and pol percent cane with polyoxyethylene sorbitan monolaurate providing the most improvement.

EXAMPLE II

The procedure of Example I was repeated on stalks 14.25 months of age in a different field with 0.3 ml/stalk deposits (corresponds to about 33 lb/acre) of polyoxyethylene sorbitan monolaurate. The following results were obtained.

|  | Time From Treatment to Harvest | | | |
|---|---|---|---|---|
|  | Four Weeks | | Five Weeks | |
|  | Juice Purity | Pol % Cane | Juice Purity | Pol % Cane |
| Control (untreated) | 77.80 | 10.08 | 75.59 | 9.04 |
| Polyoxyethylene sorbitan monolaurate (33 lbs/acre) | 78.98 | 10.64 | 84.70 | 12.28 |

A very apparent improvement in sucrose yield and juice purity results.

EXAMPLE III

Example I was repeated on stalks 16.8 months of age with 0.6 ml/stalk deposits (about 66 lbs/acre) of polyoxyethylene sorbitan monolaurate with the following results:

|  | Time From Treatment to Harvest | | | |
|---|---|---|---|---|
|  | Four Weeks | | Five Weeks | |
|  | Juice Purity | Pol % Cane | Juice Purity | Pol % Cane |
| Control (untreated) | 77.56 | 9.48 | 79.65 | 9.56 |
| Polyoxyethylene sorbitan monolaurate (66 lbs/acre) | 83.93 | 12.58 | 82.67 | 10.89 |

Again, the improvement in sucrose yield and juice purity is apparent.

EXAMPLE IV

Polyoxyethylene sorbitan monolaurate is applied to stalks 17.5 months of age in three different amounts following the procedure of Example I. The amounts and results obtained are as follows:

|  | Time From Treatment to Harvest | | | |
|---|---|---|---|---|
|  | Four Weeks | | Five Weeks | |
| Polyoxyethylene sorbitan monolaurate concentration, ml/stalk | Juice Purity | Pol % Cane | Juice Purity | Pol % Cane |
| 0.15 (16 lbs/acre) | 76.41 | 9.29 | 83.59 | 11.18 |
| 0.3 (33 lbs/acre) | 78.52 | 10.16 | 78.34 | 9.91 |
| 0.6 (66 lbs/acre) | 72.92 | 8.65 | 80.95 | 10.88 |
| 0 (untreated control) | 73.02 | 9.24 | 76.28 | 9.20 |

The results show that the sucrose yield and purity are improved over a widely varying range of concentration of application of the sugarcane ripening agent.

EXAMPLE V

The procedure of Example I was repeated on stalks 20.3 months old using 38 mg/stalk deposits (4 lbs/acre) of polyoxyethylene sorbitan monooleate. A similar treatment was again made with Trysben for comparison purposes. The following results were obtained:

|  | Time From Treatment to Harvest | | | |
|---|---|---|---|---|
|  | Four Weeks | | Five Weeks | |
|  | Juice Purity | Pol % Cane | Juice Purity | Pol % Cane |
| Polyoxyethylene sorbitan monoleate (4 lbs/acre) | 78.57 | 9.95 | 77.87 | 10.32 |
| Trysben (4 lbs/acre) | 75.57 | 8.98 | 82.79 | 11.70 |
| Control (untreated) | 66.85 | 7.26 | 75.83 | 9.47 |

The improved results are apparent.

EXAMPLE VI

Example I was repeated on stalks 16 months of age with 38 mg/stalk deposits (4 lbs/acre) of polyethylene oxide adducts of the monopalmitate and monostearate esters of sorbitol. Comparative treatments with Trysben were also made. The following results were obtained:

|  | Time From Treatment to Harvest | | | |
|---|---|---|---|---|
|  | Four Weeks | | Five Weeks | |
|  | Juice Purity | Pol % Cane | Juice Purity | Pol % Cane |
| Polyoxyethylene sorbitan monopalmitate (4 lbs/acre) | 71.60 | 8.07 | 71.43 | 8.13 |
| Polyoxyethylene sorbitan monostearate (4 lbs/acre) | 77.04 | 9.31 | 62.52 | 5.67 |
| Trysben (4 lbs/acre) | 72.74 | 8.24 | 73.95 | 8.70 |
| Control (untreated) | 65.98 | 6.52 | 61.62 | 5.84 |

Again, substantial improvements in sucrose yield and purity are apparent.

EXAMPLE VII

Example I was repeated on stalks 15 months of age with 38 mg/stalk deposits (4 lbs/acre) of polyoxyethylene sorbitan trioleate. Comparative treatments with Trysben were also made. The following results were obtained:

|  | Time From Treatment to Harvest | | | |
|---|---|---|---|---|
|  | Four Weeks | | Five Weeks | |
|  | Juice Purity | Pol % Cane | Juice Purity | Pol % Cane |
| Polyoxyethylene sorbitan trioleate (4 lbs/acre) | 72.09 | 8.32 | 70.85 | 7.65 |
| Trysben (4 lbs/acre) | 69.03 | 7.96 | 72.41 | 8.14 |
| Control (untreated) | 56.95 | 5.12 | 67.99 | 6.14 |

Substantial improvements in sucrose yield and purity are apparent.

EXAMPLE VIII

Example IV was repeated. Polyoxyethylene sorbitan monolaurate was applied to stalks 23.5 months of age in four different amounts. The amounts used and results obtained from the second harvest were as follows:

|  | Time From Treatment to Harvest | |
|---|---|---|
|  | Five Weeks | |
| Polyoxyethylene sorbitan monolaurate concentration, ml/stalk | Juice Purity | Pol % Cane |
| 0.3 (33 lbs/acre) | 84.70 | 13.08 |
| 0.15 (15 lbs/acre) | 85.09 | 12.66 |
| 0.075 (8 lbs/acre) | 81.73 | 11.73 |
| 0.03 (3.3 lbs/acre) | 78.90 | 10.36 |
| Trysben | 82.49 | 11.30 |
| 0 (untreated control) | 75.42 | 9.03 |

EXAMPLE IX

Example I was repeated on stalks 21.25 months of age at time of application using deposits equivalent to 4, 2, and 1 lbs/acre of polyoxyethylene sorbitan monolaurate. The plants were harvested four weeks after application with the following results:

| Polyoxyethylene sorbitan monolaurate concentration, mgm/stalk | Juice Purity | Pol % Cane |
|---|---|---|
| 38 (4 lbs/acre) | 79.72 | 11.96 |
| 19 (2 lbs/acre) | 77.87 | 10.16 |
| 10 (1 lb/acre) | 71.26 | 7.87 |
| Trysben (4 lbs/acre) | 80.70 | 10.91 |
| Control (untreated) | 64.40 | 6.66 |

These results clearly show a relative decrease in ripening activity for polyoxyethylene sorbitan monolaurate when the application rate is dropped from 4 to 2 lbs/acre and the significant decrease at 1 lb/acre.

EXAMPLE X

Example IX was repeated on stalks 19.75 months of age with four different amounts of application of the polyoxyethylene sorbitan monolaurate. The results obtained are shown below:

| Polyoxyethylene sorbitan mono-laurate concentration, ml/stalk | 4 Weeks After Application | |
|---|---|---|
| | Juice Purity | Pol % Cane |
| 0.3 (33 lbs/acre) | 79.45 | 9.48 |
| 0.15 (17 lbs/acre) | 85.60 | 12.32 |
| 0.075 (9 lbs/acre) | 75.00 | 9.14 |
| 0.03 (3 lbs/acre) | 75.54 | 9.10 |
| Trysben (4 lbs/acre) | 75.19 | 8.88 |
| 0 (untreated control) | 69.88 | 8.09 |

A very apparent improvement in sucrose yield and juice purity again result from the use of the invention. Furthermore, the results indicate that the compounds of the invention are highly effective for the intended purpose and relatively independently of the amount of agent applied. As can be seen, 0.03 ml of active compound per stalk will produce an increase in sucrose yield but higher dosages produce further benefits.

Again, substantial improvements in sucrose yield and purity are apparent. Furthermore, the results of Examples I through X indicate that the compounds of the invention are highly effective for the intended purpose relatively independently of the degree of ripeness which the cane has naturally reached at the time of the chemical treatment and at widely varying amounts of application.

Comparative Example A

A number of compounds which are known and used as surfactants in various applications were tested in the same manner as the compounds of the present invention. Among the compounds tested were "Aerosol OT" (dioctyl ester of sodium sulfosuccinic acid) which showed little or no sugarcane ripening activity and a large group of substituted benzene sulfonic acids, benzene sulfonamides, benzene sulfinic acids, phenyl sulfones and benzyl sulfones, none of which showed any sugarcane ripening activity. Representative runs utilizing these compounds are given below in Table A.

Table A

| | Time of Harvest | | | |
|---|---|---|---|---|
| | Four Weeks After Application | | Five Weeks After Application | |
| Compound | Juice Purity | Pol % Cane | Juice Purity | Pol % Cane |
| Aerosol OT[1] | 66.49 | 8.88 | 65.17 | 6.72 |
| Control | 64.40 | 6.72 | 68.42 | 7.56 |
| 3,3'-dinitro-4,4'-dichloro-diphenylsulfone[2] | 63.88 | 7.05 | 65.47 | 6.44 |

Table A-Continued

| | Time of Harvest | | | |
|---|---|---|---|---|
| | Four Weeks After Application | | Five Weeks After Application | |
| Compound | Juice Purity | Pol % Cane | Juice Purity | Pol % Cane |
| Control | 63.93 | 6.81 | 71.68 | 7.98 |
| 2,4,5-trichloro-phenyl-benzylsulfone[2] | 51.29 | 3.86 | 57.33 | 4.99 |
| Control | 56.53 | 5.16 | 63.59 | 6.17 |

[1] Applied to growing sugarcane, 20.25 months of age, at a rate of 0.3 ml/stalk which corresponds to 33 lbs/acre.
[2] Applied to growing sugarcane, 22 months of age, at a rate of 38 ml/stalk which corresponds to 4 lbs/acre.

Other known surfactants which are tested on field grown sugarcane with similar results include 2,4-dinitrobenzene sulfonic acid; N'-n-butyl-3-amino-4-methoxybenzene-sulfonamide; N-diethyl-3-amino-4-methoxybenzene-sulfonamide; 3,4,3',4'-tetrachlorodiphenylsulfone; 2,4,5-trichlorobenzene sulfinate; 2,4,5-trichlorodiphenylsulfone; 2,4-dinitro4'-chlorodiphenylsulfone; 4-nitro-2,4'-dichlorodiphenylsulfone; 3,4,4'-trichlorodiphenylsulfone; 2,4,4',5-tetrachlorodiphenylsulfone; 5-nitro-1',4', 5'-trichlorodiphenylsulfone; 2-chloro-4-nitrodiphenylsulfone; p-chlorophenylbenzyl sulfone; 2-chloro-4-nitrophenylbenzyl sulfone; and butyl methane sulfonate.

These results show that the use of a particular material as a surfactant has no relationship to the activity (or lack thereof) of the same material as a sugarcane ripening agent.

Comparative Example B

Field growing sugarcane is contacted with an aqueous composition of an experimental active ripener and 0.05 lb/acre of a surfactant which is a nonylphenyl ethoxylate having an average of 10.5 ethoxy groups per mole. A similar sugarcane area is treated with an aqueous composition of the same experimental active ripener without the surfactant. Samples are taken from each area each week for 13 weeks after application and the purity and the pol percent cane are determined. The results are shown below in Table B.

Table B

| Weeks after application | Purity | | | Pol % Cane | | |
|---|---|---|---|---|---|---|
| | With | Without | (Difference) | With | Without | (Difference) |
| 0 | 75.7 | 73.2 | + | 8.3 | 7.9 | = |
| 1 | 76.7 | 79.9 | − | 8.7 | 9.5 | − |
| 2 | 78.4 | 78.5 | = | 9.2 | 9.1 | = |
| 3 | 71.6 | 74.9 | − | 7.8 | 8.4 | − |
| 4 | 72.0 | 69.6 | + | 7.9 | 7.1 | + |
| 5 | 74.8 | 73.4 | = | 9.1 | 8.0 | + |
| 6 | 73.7 | 74.5 | = | 8.7 | 8.2 | = |
| 7 | 75.3 | 76.7 | = | 9.0 | 9.2 | = |
| 8 | 77.9 | 81.4 | − | 9.8 | 10.7 | − |
| 9 | 78.7 | 73.5 | + | 10.3 | 8.5 | + |
| 10 | 79.5 | 76.4 | + | 10.9 | 10.1 | + |
| 11 | 82.2 | 81.8 | = | 10.9 | 10.5 | = |
| 12 | 80.8 | 82.2 | = | 11.1 | 11.3 | = |
| 13 | 78.3 | 79.7 | = | 10.5 | 10.7 | = |

If it is assumed in this instance that it takes at least 2 points of purity to make a significant difference, then there were 4 gains, 3 loses, and 7 evens for the 13 weeks of sampling. Further, if it is assumed that at least one-half point of pol percent cane is enough to make a significant difference, then there were 4 gains, 3 losses, and 6 evens for 13 weeks of sampling. All of which strongly indicates that there is no effect whatsoever of surface active agents at this level, 0.05 lb/acre, a commonly used level of surfactant for this type of application.

Comparative Example C

Various materials found to be active in an original screening test (at a rate of 4 lbs/acre) are applied to field growing sugarcane at lower rates including 1 lb/acre and less of active material. More than 3,000 compounds have been tested over an extended period of time and only 2 compounds (one of which is methyl-3,6-dichloro-0-anisate and the other of which is currently chemically unidentified by its supplier) are found to be active at a rate 1 lb/acre or less. Typical runs are shown below in Table C.

Table C

| Compound | Time of Harvest | | | |
| --- | --- | --- | --- | --- |
| | Four Weeks After Application | | Five Weeks After Application | |
| | Juice Purity | Pol % Cane | Juice Purity | Pol % Cane |
| 3-carboxy-1-(p-chlorophenyl)-4,6-dimethyl-2-pyridone, Na salt | | | | |
| 19 mg/stalk[1] | 79.48 | 9.98 | 83.99 | 12.52 |
| 9.5 mg/stalk[1] | 77.69 | 9.58 | 72.35 | 8.01 |
| Control | 77.56 | 9.48 | 79.65 | 9.56 |
| Cetyltrimethylammonium bromide | | | | |
| 38 mg/stalk[2] | 81.50 | 9.80 | 86.80 | 11.50 |
| 19 mg/stalk[2] | 77.10 | 8.60 | 73.40 | 7.60 |
| Control | 74.00 | 7.60 | 77.10 | 11.70 |
| 6-azauracil 38 mg/stalk[3] | 70.24 | 8.28 | 77.93 | 10.21 |
| 6-azauracil 19 mg/stalk[3] | 65.34 | 6.20 | 67.48 | 7.15 |
| Control | 59.52 | 5.71 | 67.68 | 6.93 |

[1] Applied to growing sugarcane, 16.5 months of age, at a rate of 19 and 9.5 ml/stalk which corresponds to 2 and 1 lb/acre.
[2] Applied to growing sugarcane, 16.0 months of age, at a rate of 38 and 19 ml/stalk which corresponds to 4 and 2 lb/acre.
[3] Applied to growing sugarcane, 16.0 months of age, at a rate of 38 and 19 ml/stalk which corresponds to 4 and 2 lb/acre.

The nature, scope, utility and effectiveness of the present invention have been described and specifically exemplified in the foregoing specification. However, it should be understood that these examples are not intended to be limiting and that the true scope of the invention to be protected is particularly pointed out in the appended claims.

What is claimed is:

1. A process for increasing the sugar yield of grown sugarcane which comprises applying to the cane at a time at least about 2 weeks and up to about 10 weeks prior to harvest an amount effective to increase the sugar yield of a composition containing as essentially the sole active ingredient a polyethylene oxide adduct of a fatty acid ester of sorbitol.

2. A process according to claim 1 wherein said active ingredient is applied to the cane at a rate corresponding to from about 4 to about 60 pounds per acre.

3. A process according to claim 1 wherein said active ingredient contains from about 10 to 30 moles of polyethylene oxide per mole of sorbitol.

4. A process according to claim 1 wherein the active ingredient is polyoxyethylene sorbitan monolaurate.

5. A process according to claim 1 wherein the active ingredient is applied to the cane at a time of between about 3 and 8 weeks before harvest.

6. A process according to claim 1 wherein said active ingredient is polyoxyethylene sorbitan monopalmitate.

7. A process according to claim 1 wherein the active ingredient is polyoxyethylene sorbitan monostearate.

8. A process according to claim 1 wherein the active ingredient is polyoxyethylene sorbitan monooleate.

9. A process according to claim 1 wherein the active ingredient is polyoxyethylene sorbitan monolaurate containing about 20 moles of polyoxyethylene oxide per mole of sorbitan, said active ingredient being applied to the cane at a rate of from about 4 to about 60 pounds per acre and at a time of between about 3 and 8 weeks before harvest.

* * * * *